(12) United States Patent
Grauer et al.

(10) Patent No.: US 9,631,287 B2
(45) Date of Patent: Apr. 25, 2017

(54) METHOD AND FACILITY SYSTEM FOR PROVIDING AN ENERGY CARRIER BY APPLICATION OF CARBON DIOXIDE AS A CARBON SUPPLIER OF ELECTRIC ENERGY

(75) Inventors: Peter Grauer, Meggen (CH); Roland Meyer-Pittroff, Freising (DE)

(73) Assignee: Silicon Fire AG, Meggen (CH)

( * ) Notice: Subject to any disclaimer, the term of this patent is extended or adjusted under 35 U.S.C. 154(b) by 961 days.

(21) Appl. No.: 13/140,826

(22) PCT Filed: Aug. 13, 2009

(86) PCT No.: PCT/EP2009/060472
§ 371 (c)(1),
(2), (4) Date: Sep. 29, 2011

(87) PCT Pub. No.: WO2010/069622
PCT Pub. Date: Jun. 24, 2010

(65) Prior Publication Data
US 2012/0010305 A1   Jan. 12, 2012

(30) Foreign Application Priority Data

Dec. 18, 2008   (EP) .................... PCT/EP2008/067895
Mar. 4, 2009   (EP) ..................................... 09154271

(51) Int. Cl.
C25B 15/00   (2006.01)
C25B 3/04   (2006.01)
(Continued)

(52) U.S. Cl.
CPC ................ *C25B 15/00* (2013.01); *C10G 2/50* (2013.01); *C25B 1/04* (2013.01); *C25B 3/04* (2013.01);
(Continued)

(58) Field of Classification Search
CPC .. C25B 1/04; C25B 15/00; C25B 3/04; C10G 2/50; Y02E 60/366; Y02E 20/133; Y02E 20/134; Y02E 70/10
See application file for complete search history.

(56) References Cited

U.S. PATENT DOCUMENTS 3,215,522 A   11/1965   Kuhlmann
4,457,902 A   7/1984   Watson
(Continued)

FOREIGN PATENT DOCUMENTS

DE   2924584 A1   1/1981
EP   0357395 A3   8/1989
(Continued)

OTHER PUBLICATIONS

Robert Palumbo, Encyclopedia of Physical Science & Technology, R.A Meyers Ed., Academic Press, vol. 15, pp. 237-256, 2001.*
(Continued)

*Primary Examiner* — Jafar Parsa
(74) *Attorney, Agent, or Firm* — Sideman & Bancroft LLP; Guy W. Chambers (57) ABSTRACT

The invention relates to methods and facility systems (100) for providing storable and transportable carbon-based energy carriers (108) by application of carbon dioxide (101) as a carbon supplier and by application of electric energy (E1, E2). The facility system (100) comprises a plant (300, 301; 400) for providing a first portion of energy in the form of direct current energy (E1) from renewable energy sources. In addition, a power supplies facility (501) is provided for tying the facility system (100) to a mixed network (500), wherein the power supplies facility (501) produces a second portion of energy in the form of direct current energy (E2) from an alternating current voltage of the mixed network (500). A device (102, 105) is adapted to provide hydrogen (103), wherein a part of the energy (Continued)

requirement of this device (102, 105) is covered by said first portion of energy and another part is covered by said second portion of energy. A carbon dioxide supply serves for introducing carbon dioxide (101) and a reaction area (106) is provided for producing a hydrocarbon, preferably methanol (108).

8 Claims, 4 Drawing Sheets (51) Int. Cl.
*C10G 2/00* (2006.01)
*C25B 1/04* (2006.01)

(52) U.S. Cl.
CPC ............ *Y02E 60/366* (2013.01); *Y02E 70/10* (2013.01); *Y02P 20/133* (2015.11); *Y02P 20/134* (2015.11)

(56) References Cited

U.S. PATENT DOCUMENTS

| | | |
|---|---|---|
| 6,540,902 B1 | 4/2003 | Redey et al. |
| 2002/0033332 A1 | 3/2002 | Handa |
| 2006/0246001 A1 | 11/2006 | Auner |
| 2008/0283411 A1 | 11/2008 | Eastman |

FOREIGN PATENT DOCUMENTS

| | | |
|---|---|---|
| EP | 1518826 A1 | 3/2005 |
| EP | 1918248 A2 | 5/2008 |
| WO | WO 0226625 A2 | 4/2002 |
| WO | WO 02090257 A1 | 11/2002 |
| WO | WO 2004052774 A2 | 6/2004 |
| WO | WO 2006037999 A3 | 4/2006 |
| WO | WO 2006092615 A1 | 9/2006 |
| WO | WO 2007116326 A2 | 10/2007 |

OTHER PUBLICATIONS

Kouji Yasuda, et al; "Effect of electrolysis potential on reduction of solid silicon dioxide in molten CaCl2"; Journal of Physics and Chemistry of Solids 66, (2005) pp. 443-447.

Toshiyuki Nohira*, et al; "Pinpoint and Bulk Electrochemical Reduction of Insulating Silicon Dioxide to Silicon"; Department of Fundamental Energy Science, Graduate School of Energy Science,Kyoto University,Sakyo-ku,Kyoto 606-8501,Japan; e-mail: nohira@energy.kyoto-u.ac.jp; Published online: May 18, 2003; pp. 397-401.

George Zheng Chen et al, "Direct electrochemical reduction of titanium dioxide to titanium in molten calcium chloride"; Macmillan Magazines Ltd, Nature vol. 407 www.nature.com; Sep. 21, 2000; pp. 361-364.

Production of Silicon Without a Carbon Reductant; The Coastwatchers Association Inc. (2001); 2 pages.

International Search Report and Written Opinion under Patent Cooperation Treat (PCT) for PCT/EP2009/0600472; Mar. 2, 2010; 14 pages.

* cited by examiner

Fig. 6

METHOD AND FACILITY SYSTEM FOR PROVIDING AN ENERGY CARRIER BY APPLICATION OF CARBON DIOXIDE AS A CARBON SUPPLIER OF ELECTRIC ENERGY

CROSS-REFERENCES TO RELATED APPLICATIONS

The present application claims the priorities of Patent Cooperation Treaty Application No. PCT/EP2009/060472, filed on Aug. 13, 2009; European Patent Application No. 09154271.2, filed Mar. 4, 2009; and Patent Cooperation Treaty Application No. PCT/EP2008/067895, filed Dec. 18, 2008; all of which are incorporated herein by reference in their entirety for all purposes.

FIELD OF THE INVENTION

The present application concerns methods and facility systems for providing storable and transportable carbon-based energy carriers by application of carbon dioxide as a carbon supplier and by application of electric energy.

BACKGROUND OF THE INVENTION

Carbon dioxide $CO_2$ (often called carbonic acid gas) is a chemical compound composed of carbon and oxygen. Carbonic acid gas is a color- and odorless gas. It is a natural component of the air, with a low concentration, and is produced by in animals during the cell respiration, but also during the combustion of carbon-containing substances under sufficient presence of oxygen. Since the advent of the industrialization, the $CO_2$ proportion in the atmosphere has risen markedly. A main cause for this are the $CO_2$ emissions caused by human beings—the so-called antroprogenic $CO_2$ emissions. The carbonic acid gas in the atmosphere absorbs a portion of the heat radiation. This property renders carbonic acid gas to be a one of the so-called Green House Gases (GHG) and is one of the co-originators of the global greenhouse effect. For these and also for other reasons, research and development is performed at present in the most different directions to find a way to reduce the antroprogenic $CO_2$ emissions. In particular, in relation with the generation of energy which is often carried out by the combustion of fossil energy carriers such as coal, oil or gas, but also by other combustion processes, for example waste incineration, there is a great demand for $CO_2$ reduction. Per year, more than twenty billion tons of $CO_2$ are released into the atmosphere by such processes.

Figure 1:
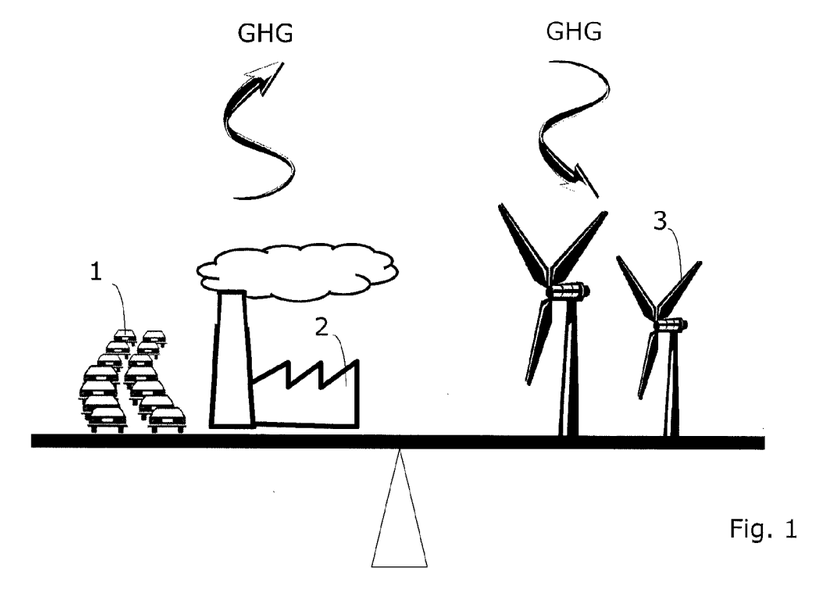
FIG. 1: shows a scheme representing the principle of climate neutrality by the investment in or the operation of compensation projects.

Among others, the principle of climate neutrality is aimed at by pursuing approaches in which efforts are made to compensate the generation of energy accompanied by $CO_2$ emissions by using alternative energies. This approach is represented in FIG. 1 in a very schematic manner. Emitters of greenhouse gases (GHG), such as industrial enterprises (e.g. manufacturers of automobiles) 1 or power plant operators 2, invest in or operate, e.g. wind farms 3 at other locations in the framework of compensation projects to generate energy there without GHG emissions. Purely on the basis of calculations, it is thus possible to achieve climate compensation. Numerous companies try to buy a "climatically neutral" profile in this way.

Wind and solar power plants which convert the renewable energies into electric energy have an unsteady delivery of power, which hampers the operation of a facility according to the requirements of an electrically mixed network and gives rise to facility and operation costs for additional reserve and frequency regulation facilities. Accordingly, the costs of power generation from wind or solar power plants are thereby raised significantly compared to conventional power.

It is seen as a problem that at present almost all regenerative electric energy that is produced is supplied to the public AC voltage mixed network, the frequency of which is allowed to vary only within very narrow boundaries (e.g., +/−0.4%). This can only be achieved when the generation of electric current in the network is virtually always equal to the consumption. The necessity that wind and solar power plants must always hold available the sufficient reserve and frequency regulation capacities leads to an increase in the costs of power generation with these facilities. Wind and solar power plants within the electrical mixed network thus result in further "hidden" costs and problems.

Already at the present stage of completion of wind power plants in many countries, the electric power supply network may create serious problems, if, e.g., as a result of wind scarcity or strong winds, wind power fails at a large scale, in particular if this failure occurs suddenly or unexpectedly. In any case however, reserve and frequency regulation capacities are necessary, which are adapted to the installed wind and solar output.

It follows from the above that solar and wind power plants which supply (current) into an electrical mixed network can hardly replace the installed outputs of other power plants in the mixed network. This leads to a situation that solar and wind power may be valuated approximately only with the saved fuel cost of the other heat power plants present in the network.

SUMMARY OF THE INVENTION

Now it is seen as an object to provide a method that is capable to generate storable hydrocarbon-based energy carriers, for example as fuels or combustibles. The provision of these energy carriers should be accomplished with an additional emission of $CO_2$ that is as low as possible, and the application of these energy carriers should contribute to a reduction of the $CO_2$ emission.

According to the invention, a method and a facility system (device) for providing storable and transportable energy carriers are provided.

According to a first embodiment of the invention, carbonic acid gas is utilized as a carbon supplier. Preferably, the carbonic acid gas is extracted from a combustion process or from an oxidation process of carbon by means of $CO_2$ precipitation. Electric direct current (DC) energy is provided. This DC energy is generated largely by means of renewable energies, and it is utilized to perform an electrolysis so as to generate hydrogen as an intermediate product. The carbonic acid gas is then brought to a reaction with the hydrogen so as to transform these products to methanol or to another hydrocarbon.

In another preferred embodiment, a transformation takes place in a reduction process from a silicon-dioxide-containing starting material to silicon, whereby the energy for this reduction process is provided to a large extent from renewable energies. A portion of the reaction products of this reduction process is then used in the process for generating methanol, wherein in this methanol generating process, a synthesis gas of carbonic acid gas and hydrogen is used. The conversion from a silicon-dioxide-containing starting material to silicon can be performed as an additional method step.

According to the invention, a facility system operation is prepared which is as constant and long-term as possible, and this is achieved by the addition to the supply of regenerative power of a conventional (e.g., fossil) supply of power from a mixed network. Preferably, according to the invention, the conventional power supply is tied in during the low-load period of the electrical mixed network. This means that, e.g., a wind and/or solar power plant and the plant according to the invention are tied mutually with the existing electrical mixed network in a way that is economically and ecologically optimized as far as possible, such that the total yield of the reaction products becomes as large (maximal) as possible;

and/or the $CO_2$ emission becomes as low (minimal) as possible;

and/or a capacity utilization of the facility is achieved that is as constant and long-term as possible;

and/or the product specific costs of investment and operation of the regenerative power plant and of the plant of the present invention become as low (minimal) as possible.

According to the invention, the electric energy from wind and/or solar power plants is not supplied to a mixed network, but is converted directly to storable and transportable energy forms (preferably hydrocarbons, such as e.g. methanol). That is, the renewable energies are converted into storable and transportable energy forms in a chemical way.

It is a further advantage of the conversion to storable and transportable energy forms that the energy conversion efficiency is raised, because in photovoltaic plants, no alternating current (AC) converters for generating an alternating voltage are required and transport over a large distance of the electric energy through long high voltage lines is generally not required.

The generation costs of the renewable electric energy from solar and wind power plants will be relatively high for a conceivable time. This results in a direct usage of such electric energy for chemical processes, as proposed herein, the chemical products are more expensive than the conventionally fabricated products—fabricated generally using fossils. This holds in particular, when the real environmental damages caused, e.g., by a fossil power plant, are not internalized, i.e., taken into account in the total balance.

In order to avoid this disadvantage, in the plant according to the invention, creates a combination of regenerative and a conventional power supply which is as economically and ecologically optimized as possible in networking with an available electrical mixed network. The plant concept therefore conceives in a preferred embodiment to use regenerative electric energy according to its production and electric energy from an electrical mixed network primarily in the low-load periods thereof for chemical reactions and thus to also store it. In periods of electrical peak power demands in the electrical mixed network, the regenerative energy can be supplied also to the mixed network—to achieve higher proceeds. This supply is optional.

Instead of supplying the regenerative electric energy from wind and/or solar power plants which evolves unsteadily to an electrical mixed network and of balancing and regulating their variations and failures by means of other power plants or storage facilities, the electric energy from wind or solar power plants is preferably used to operate a chemical plant of the present invention so as to generate storable and transportable energy forms. In the case that where a plant of the present invention is tied to a mixed network in order to extract a portion of the electric energy from the mixed network, a presently available excess energy portion can be extracted from the mixed network by means of an intelligent facility regulation or control, while the remaining required energy portion is taken from the solar and/or wind power plant associated with the plant. Thereby, an intelligent reversal of the existing principle is achieved, in which the variations of the regenerative power from wind and/or solar power plants must be buffered tying in conventional power plants and/or storage facilities. For operating a plant of the present invention, it is therefore not necessary to hold available any regulation and power reserves in the electrical mixed network. This principle leads to significant reduction of costs and enables a user to take into account additional technical and economical parameters in the control of the plant.

In addition, the regulation and control of the power supply of the plant becomes significantly simpler and more reliable, since the decision taking authority thereon rests in the range of responsibilities of the operator of the plant. In a conventional mixed network, which takes electric current from renewable energy facilities and conventional plants, numerous partners are involved, and this makes the tying in of the facilities with respect to the regulation and control technology and the decision making very complex, which also lead to supply failures in the recent past.

The production of the storable and transportable energy forms can be shut-down or even interrupted at any time. This happens preferably in cases when a peak energy demand exists in the electrical mixed network. The "chemical part" of the of the present invention can be shut-down or switched off relatively easily and quickly. Also here, the decision taking authority rests in the range of responsibilities of the operator of the plant of the present invention.

The energy form which is provided by the chemical plant of the present invention can serve as an additional energy buffer. Thus, methanol can be stored, for example, in order to provide additional electric power to the electrical mixed network during peak power demands. Methanol can be combusted on request, for example, in heat power plants, or electric energy can be generated therewith in fuel cells (e.g., direct-methanol fuel cells, called MFC).

The present invention is also based on the generation of hydrogen with the aid of electric energy largely taken from wind and/or solar power plants in combination with the direct conversion of the hydrogen to a hydrocarbon. Hydrogen is thus not stored or highly condensed or cooled and transported over large distances, but serves as an intermediate product that is converted at the site of its generation. According to the invention, substance-converting (chemical) processes, notably the intermediate provision of hydrogen and the conversion of the hydrogen together with carbonic acid gas to a hydrocarbon (e.g., methanol) follow an energy-converting process, in which solar energy or wind energy is converted into electric energy.

Taking into account standards in energy technology, facility technology and economics, together with the demand for a preserving use of all material, energetical and ecological resources, a new solution in energy technology is provided according to the invention.

Further advantageous embodiments can be taken from the description, the Figures and the dependent claims.

BRIEF DESCRIPTION OF THE DRAWING

In the drawings, different aspects of the invention are represented schematically, wherein.

DETAILED DESCRIPTION OF THE PREFERRED EMBODIMENTS

The method according to the invention is based on a new concept, which by using available starting materials provides so-called reaction products that are either directly usable as an energy carrier or that are indirectly usable as energy carriers, i.e. after performing additional intermediate steps.

The term energy carrier is used herein to designate compounds, which may either be used directly as a fuel or combustion material (such as, e.g., methanol 108) and also compounds (such as, e.g., silicon 603), which have an energy content or an elevated energy level and which can be converted in further steps with delivery of energy (refer to energy E3 in FIG. 6) and/or with delivery of a further energy carrier (such as, e.g., hydrogen 103).

The transportability of the energy carrier is herein characterized by the chemical reaction potential.

In the case of hydrocarbons (such as methanol 108) being used as an energy carrier, specific framework conditions should be respected during its storage and transport, which conditions are similar to the conditions for the handling of fossil fuels. In this respect, the existing infrastructure can be used without problems. Specific adaptations may be required only as far as the compounds are concerned.

In the case of silicon 603 being used as an energy carrier, specific framework conditions should be respected during its storage and transport so as to avoid initiating an undesired or uncontrolled reaction (oxidation) of the silicon. The silicon 603 should be stored and transported preferably in a dry state. In addition, the silicon 603 should not be heated because otherwise the probability of a reaction with water vapor from the ambient air or with oxygen rises. Investigations have shown that up to approximately 300° C., silicon has very little tendency to react with water or oxygen. The storage and transport of the silicon 603 together with a water getter (i.e., a compound that is hydrophillic/attracting water) and/or an oxygen getter (i.e., a compound that is attracting oxygen) is ideal.

The term silicon-dioxide-containing starting material 601 is used herein to designate compounds which contain a large proportion of silicon dioxide ($SiO_2$). Sand and shale ($SiO2+[CO_3]^2$) are particularly suitable. Sand is a naturally occurring non-consolidated sedimentary rock and occurs everywhere on the surface of the Earth in large concentrations. A majority of the occurances of sand consist of quartz (silicon dioxide, $SiO_2$).

Figure 2:
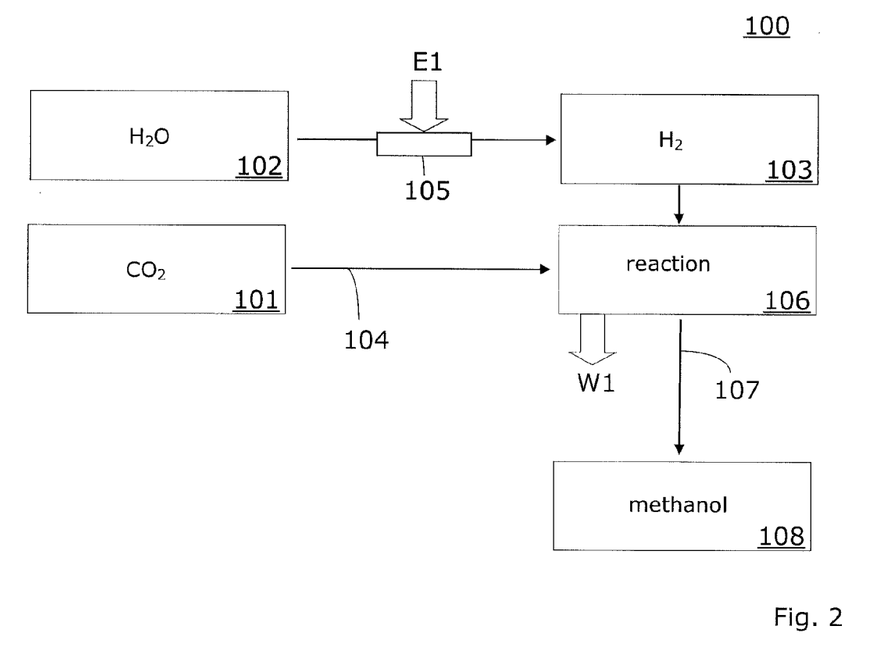
FIG. 2: shows the basic steps of a first method to create a chemical plant of the present invention.

According to a first embodiment of the invention, carbonic acid gas 101 is used as a carbon supplier, as indicated schematically in FIG. 2. The carbonic acid gas 101 is preferably extracted from a combustion process 201 (symbolized by a fire in FIG. 3) or from an oxidation process through $CO_2$ precipitation (e.g., a Silicon-Fire flue gas cleaning facility 203). Furthermore, electric DC power E1 is provided. The DC power E1 is produced regeneratively (e.g., by one of the facilities 300 or 400 in FIG. 4). The DC energy E1 is used to carry out an electrolysis so as to generate hydrogen 103 as an intermediate product. The electrolysis facility, which carries out such electrolysis, is characterized in FIG. 2 by the reference numeral 105. The carbonic acid gas 101 is then brought to reaction with the hydrogen 103 (e.g., by a synthesis of methanol) so as to convert the (intermediate) products 101, 103 to methanol 108 or to another hydrocarbon. The reaction can be carried out in a reaction containment 106, and the extraction of the methanol is characterized in FIG. 2 by the reference numeral 107.

In the following, further basic details of this method and the corresponding plant 100 are described.

A water electrolysis with an application of DC current E1 is suitable in order to be able to generate hydrogen 103 as an intermediate product. The required hydrogen 103 is produced in an electrolysis facility 105 by the electrolysis of water $H_2O$:

$$H_2O - 286.02 \text{ kJ} = H_2 + 0.5 O_2 \quad \text{(Reaction 1)}$$

The required (electric) energy E1 for this reaction amounting to 286.02 kJ mol corresponds to 143,000 kJ per kg $H_2$.

The synthesis of the methanol 108 ($CH_3OH$) proceeds in the Silicon-Fire plant 100 after the exothermal reaction between carbonic acid gas 101 ($CO_2$) and hydrogen 103 ($H_2$) as follows:

$$CO_2 + 3H_2 = CH_3OH + H_2O - 49.6 \text{ kJ(gaseous methanol)} \quad \text{(Reaction 2)}$$

The generated reaction heat energy W1 amounting to 49.6 kJ/mol=1,550 kJ per kg methanol=0.43 kWh per kg methanol, is extracted from the corresponding synthesis reactor 106. Typical synthesis conditions in the synthesis reactor 106 are approximately 50 bar and approx. 270° C., so that the reaction heat energy W1 can also be used for, e.g., a nearby seawater desalination facility or a heating plant.

Preferably, the synthesis of methanol is performed by application of catalysts in order to keep the reaction temperature and pressure as well as the reaction duration low and in order to ensure that high-value (pure) methanol 108 is generated as the reaction product.

In another preferred embodiment of the invention, a synthesis of methanol according to an electrolysis method propagated by Prof. George A. Olah is carried out. Details thereon can be taken, for example, from the book "Beyond Oil and Gas: The Methanol Economy", George A. Olah et al., Wiley-VCH, 1998, ISBN 0-471-14877-6, chapter 11, page 196. Further details can also be taken from the US patent application US 2009/0014336 A1. Prof. George A. Olah describes the synthesis of methanol by the electrolysis of $CO_2$ and $H_2$ as follows:

$$CO_2 + 2H_2O - 682.01 \text{ kJ} = CH_3OH + 1.5 O_2 \quad \text{(Reaction 3)}$$

In this reaction, CO and $H_2$ are generated in an intermediate step in a ratio of about 1:2. The CO and $H_2$ that is generated at a cathode, can be converted to methanol using a copper- or nickel-based catalyst. The synthesis path according to reaction 3 is related to a theoretical addition of 682.01 kJ=0.189 kWh of electric energy per mol of methanol 108 produced.

In the case that the plant of the present invention is located in the vicinity of a $CO_2$ source, it is possible to refrain from a liquefaction for the transport of $CO_2$. Otherwise, it is relatively easy according to the state of the art, to liquefy the $CO_2$ and to bring it to a plant of the present invention 100. In case of a renunciation of the liquefaction, and where necessary for storage and transport over large distances, the $CO_2$ is available in a conceivably cost-neutral way by accounting for $CO_2$ avoidance credits. Also in the case of a transport, the costs for the "buying" of the $CO_2$ are relatively low.

Figure 3:
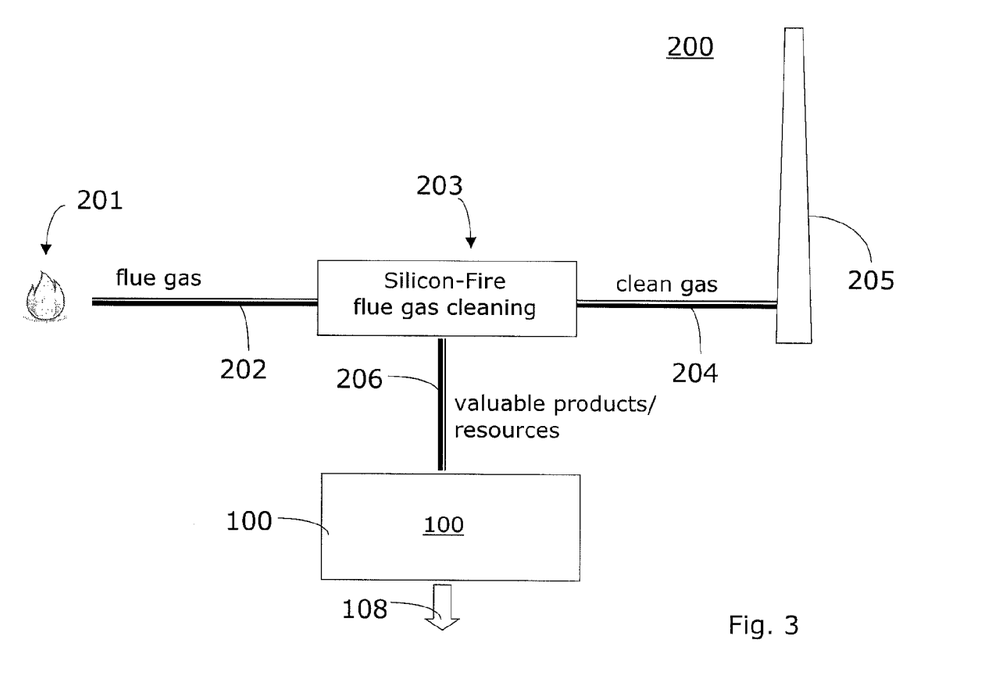
FIG. 3: shows the basic steps of a second method of creating a chemical plant according to the invention.

In FIG. 3, further steps of a first method according to the invention, respectively a part of a Silicon-Fire plant 200 are shown. The carbonic acid gas 101 is, as already mentioned, preferably extracted from a combustion process 201 (here characterized by a fire) or from an oxidation process by means of $CO_2$ precipitation, e.g., with a Silicon-Fire flue gas treatment facility 203. The Silicon-Fire flue gas treatment facility 203 can be constructed, for example, according to the principle of the cleaning of flue gas, wherein the $CO_2$ is "washed out" from the flue gas 202 using a cleaning solution. A flue gas cleaning which uses NaOH as a cleaning solution and in which the NaOH is recycled, is particularly suitable for a flue gas cleaning. Details thereon can be taken, for example, from the parallel application EP 1 958 683 filed on 7 Aug. 2007. However, other principles of $CO_2$ precipitation or production can also be used.

The Silicon Fire flue gas cleaning facility 203 allows extracting $CO_2$ (herein called a resource) from the flue gas 202. This $CO_2$ is then supplied directly or indirectly to the Silicon-Fire plant 100 which then generates/synthesizes a hydrocarbon (preferably methanol 108) under application of the $CO_2$ as a carbon supplier and under application of electric power.

Figure 4:
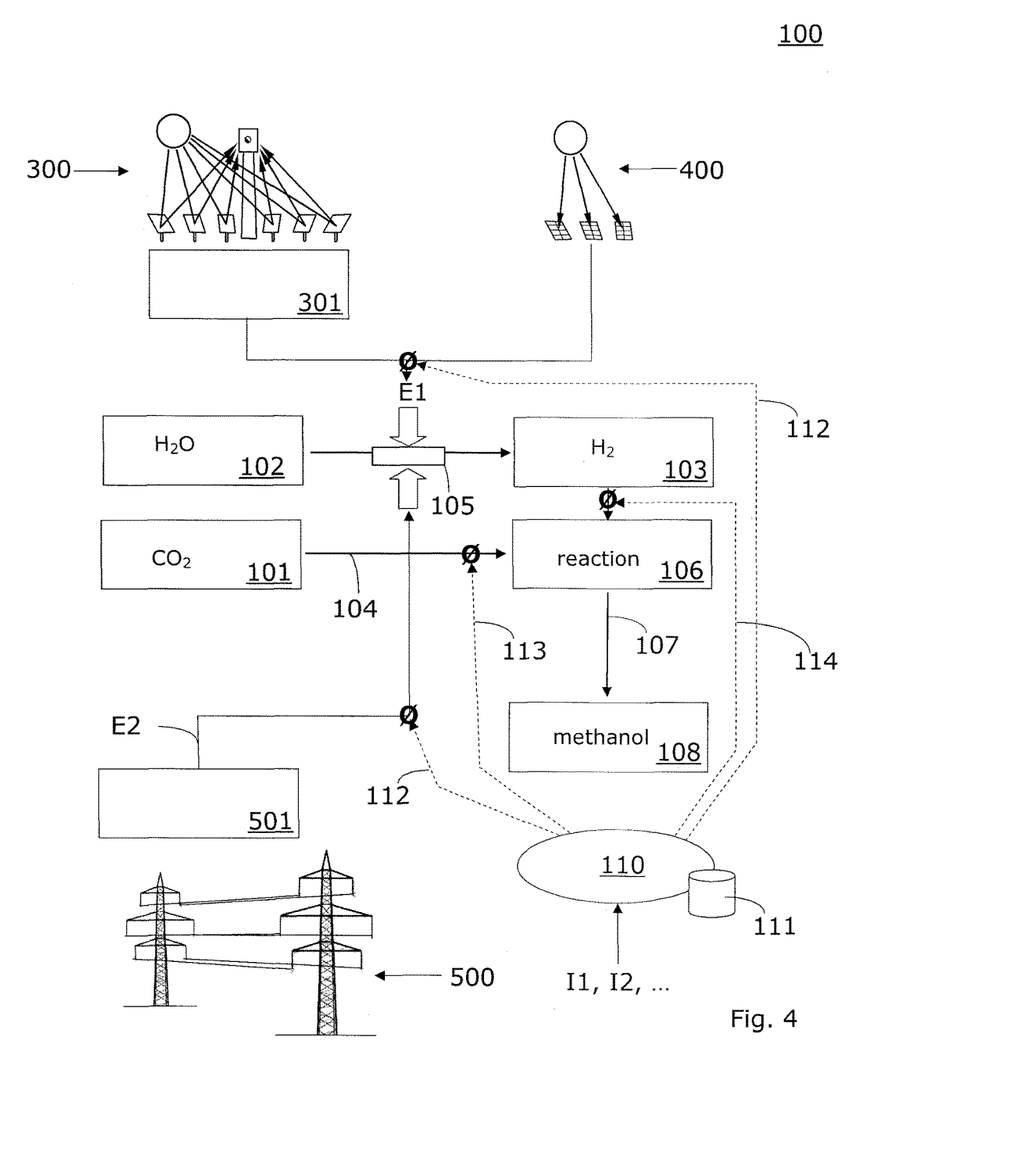
FIG. 4: shows the basic steps of a further method of creating a chemical plant according to the invention.

FIG. 4 shows, in a schematic block diagram, the most important modules/components for the method steps of a Silicon-Fire plant 100. This plant 100 is designed such that a method for providing storable and transportable energy carriers 108 can be carried out. The corresponding method is based on the following basic steps.

Carbonic acid gas 101 is provided as a carbon supplier, as already described. The required electric DC power E1 is produced using renewable energy technology and is supplied for use to the Silicon-Fire plant 100. Solar heat plants 300 and photovoltaic plants 400 which are based on solar modules are particularly suitable as renewable energy technology. It is also possible to arrange a combination of these types of plants 300 and 400 since the demand per area in relation to the electric power from the solar thermal plant 300 is less than that from a photovoltaic plant 400.

According to the invention, an electrolysis 105 is carried out under application of the electric DC energy E1 so as to produce hydrogen 103 or hydrogen ions as an intermediate product. The electrolysis 105 can be carried out according to the following three different approaches:

- either a direct water electrolysis according to Reaction 1 as represented in FIG. 4 is performed, or
- silicon is produced from a silicon-dioxide-containing composition in an electrolytic way, where the silicon then reacts with water 102 to produce hydrogen 103 and silicon dioxide in a subsequent (downstream) hydrolysis reaction, or
- methanol 108 is directly produced (refer to Reaction 3) in an electrolytic way, wherein intermediate hydrogen such as hydrogen ions are generated, which react, however, directly with the other ions or reaction partners to form methanol 108.

In the methods which do not produce methanol 108 directly in an electrolytic way, hydrogen 103 and carbonic acid gas 101 are brought together in the plant 100 so as to convert these in a reaction 106 to methanol 108 or to another hydrocarbon. The methanol 108 may then be extracted from the plant 100, as represented by the arrow 107.

In FIG. 4, a particularly preferred plant 100 is represented, which is constructed such that the initially mentioned disadvantages are reduced or compensated. For this reason, an economically and ecologically optimal combination of regenerative electric power supply (by the plants 300 and/or 400) and conventional power supply, here represented as a part of a mixed network 500, are realized using the Silicon-Fire plant according to the invention. In a preferred embodiment, the Silicon-Fire plant 100 therefore enables the regenerative electric energy E1 to be used for chemical reactions (here the electrolysis reaction 105) and thus to store it. A further portion of the required energy is taken from the mixed network 500. This portion is converted into DC energy E2. To this end, an according converter 501 comes into operation, as indicated in schematic form in FIG. 4. The corresponding facility parts or components are herein referred to as the energy supply plant 501.

The energy supply of the plant 100 is controlled and regulated by means of an intelligent facility control device 110. In principle, the respective excess energy portion E2 that is presently available is taken from the mixed network 500, while the other energy portion (here E1) is taken as largely as possible from a solar power plant 300 and/or 400 (or from a wind farm) associated with the plant. Accordingly, an intelligent reversal of the hitherto used principles is realized, in which the energy variations of renewable energy facilities 300, 400 are buffered by tying in and out (switching on and switching off) conventional facilities. For operating a Silicon-Fire plant 100, it is therefore not required to hold available additional power and frequency regulation capacities for the regenerative power plants in the mixed network 500. This principle allows the operator of a Silicon-Fire plant 100 to take into account additional technical and economical parameters in the control of the plant 100. These parameters concern so-called input parameters I1, I2, etc., which are tied in by the control device 110 when taking decisions. Some of these parameters can be predefined within the control device 110 in a parameter storage 111. Others of the parameters can be supplied from the outside. Here, for example, information on price and/or availability from the operator of the mixed network 500 may be input.

In the facility control device 110, so-called software-based decision processes are implemented. A processor of the control device 110 executes a control software and takes decisions by accounting for parameters. These decisions are transformed into switch or control instructions, which cause the control/regulation of energy and mass fluxes, for example, through the control or signal lines 112, 113, 114.

Considered from the perspective of the mixed network, the Silicon-Fire plant 100 concerns a consumer, which can be switched-on and off quickly and which can be used relatively flexible. If, for example, a sudden additional demand of electric energy occurs in the mixed network, then the control device 110 can shut down or switch off completely the portion E2. In this case, from that moment on, either accordingly less hydrogen 103 is produced whence energy E1 is available, or the electrolysis is temporarily stopped completely.

In FIG. 4 it is indicated by means of dashed arrows 112 which begin at the control device 110 that the control device 110 regulates the energy fluxes E1 and E2. The arrows 112 represent control or signal lines. Also other possible control or signal lines 113, 114 are represented. For example, the control or signal line 113 regulates the amount of $CO_2$ that is available for the reaction 106. If, for example, less hydrogen 103 is produced because no energy E2 is available, then also less $CO_2$ must be supplied. The optional control or signal line 114 can, for example, regulate the amount of $H_2$. Such a regulation makes sense, for example, in cases where there is a hydrogen buffer storage, from which hydrogen 103 can be drawn, even where there is less hydrogen or no hydrogen at all is produced momentarily by the electrolysis 105.

Investigations have shown that it is particularly economical and advantageous in an environmental sense if the Silicon-Fire plant 100 extracts between 15% and 50% of the electric energy requirement from solar energy and the remaining energy requirement from the mixed network 500 (i.e., mainly fossil). It is particularly preferable to cover between 30% and 40% of the electric energy requirement from solar energy and the remaining 70% to 60% from the mixed network 500 (i.e., mainly fossil). The intelligent facility control device 110 is set or programmed according to these specifications.

An embodiment of the plant 100, which provides for the extraction of cheap electric energy from the mixed network 500 in low-load periods, is particularly preferred.

According to a preferred embodiment of the invention, the facility control device 110 is set or programmed such that the networking between regenerative electric energy sources 300 and/or 400 and the electrical mixed network 500 is optimized such that the total costs of electric energy becomes minimal for maximum usage of the regenerative electric energy sources 300 and/or 400.

According to a preferred embodiment of the invention, the facility control device 110 is set or programmed such that the networking between regenerative electric energy sources 300 and/or 400 and the electrical mixed network 500 is optimized such that the total costs of the carbonic acid gas product 108 becomes minimal for a maximum usage of the regenerative electric energy sources 300 and/or 400 and by taking into account the total costs of the electric power and the periods of capacity utilization by operation of the whole plant 100 and its facility parts.

According to a preferred embodiment of the invention, the facility control device 110 is set or programmed such that the networking between the regenerative electric energy sources 300 and/or 400 and the electrical mixed network 500 is optimized such that revenues are gained by temporarily supplying (emerging from) the regenerative energy sources 300 and/or 400 to the electrical mixed network 500 during its peak periods and that thereby the total costs of the electric power for the method according to the invention or the total costs of the carbonic acid gas product 108 are reduced or lowered as far as possible.

In periods of a peak electric power demand of the electrical mixed network 500, the regenerative energy E1 can also be supplied to the mixed network—to obtain higher revenues.

The aspects of these preferred embodiments can easily and without problems be combined by a corresponding design of the control device 110.

In the following, further basic aspects of a method according to the invention for providing storable and transportable energy carriers are shown. In this method, silicon 603 as a first storable and transportable energy carrier and methanol 108 as a second storable and transportable energy carrier are provided. The method comprises at least the following steps.

Figure 5:
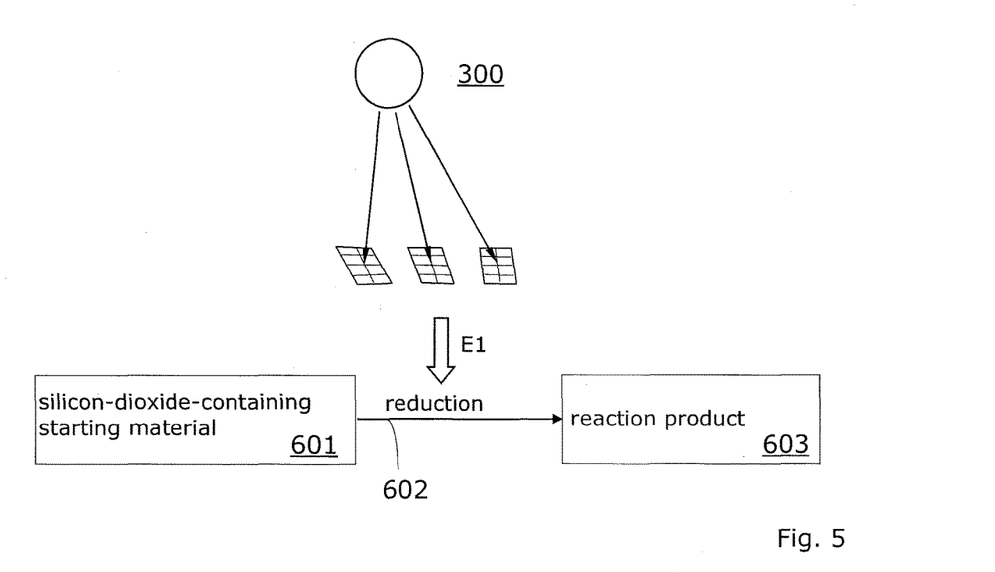
FIG. 5: shows the steps of a further partial method according to the invention.

By a transformation, a silicon-dioxide-containing starting material 601 is converted to elementary silicon 603 by means of a reduction process 602, as shown in FIG. 5. The elementary silicon 603 is herein called silicon for reasons of simplicity. The required electrical (primary) energy E1 for this reduction process 602 is provided according to the invention from a regenerative energy source 300. In a subsequent/downstream step, at least a portion of the silicon 603 can be utilized in a process for generating methanol. In this process, for example, a synthesis gas composed of carbonic acid gas 101 and hydrogen 103 comes into use in the process of generating methanol. The silicon 603 can also be extracted from the process as an energy carrier. The silicon 603 can, for example, be stored or transported away.

The transformation 602 is preferably an electrochemical electrolytical transformation (with participation of an electrical current E1), as schematically indicated in FIG. 5.

In the electrochemical transformation 602 according to FIG. 5, the (primary) energy E1 for the transformation is provided in the form of electric current which is generated from sunlight. For the electrochemical transformation 602, a solar plant 300 is utilized, as indicated schematically in FIG. 5.

The electrochemical transformation 602 can, for example, be carried out by employing silicon dioxide as an electrode. A metal is employed as the second electrode. Calcium chloride ($CaCl_2$) is, for example, used as an electrolyte. This electrochemical transformation process 602 functions particularly well with an electrode made of porous silicon dioxide, which may, for example, be sintered from silicon dioxide. Details concerning this method can be taken from the following publications:

Nature Materials, June 2003; 2(6): 397-401, Nohira T., Yasuda K., Ito Y., Publisher: Nature Pub. Group.

"New silicon production method with no carbon reductant", George Zheng Chen; D. J. Fray, T. W. Farthing, Tom W. (2000).

"Direct electrochemical reduction of titanium dioxide to titanium in molten calcium chloride", George Zheng Chen, D. J. Fray, T. W. Farthing, Nature 407 (6802): 361-364, doi: 10.1038/35030069.

"Effects of electrolysis potential on reduction of solid silicon dioxide in molten $CaCl_2$," YASUDA Kouji, NOHIRA Toshiyuki, ITO Yasuhiko; The Journal of Physics and Chemistry of Solids, ISSN 0022-3697, International IUPAC Conference on High Temperature Materials Chemistry No. 11, Tokyo, Japan (19 May 2003), 2005, vol. 66, no. 2-4 (491 p.);

U.S. Pat. No. 6,540,902 B1;

WO 2006/092615 A1.

Preferably, a reduction process 602 is performed at a temperature of approximately 1900 K (=1630° C.) so as to reduce the silicon dioxide 601 to silicon 603. In an electrochemical transformation 602, however, considerably lower temperatures (preferably less than 500° C.) are required.

Figure 6:
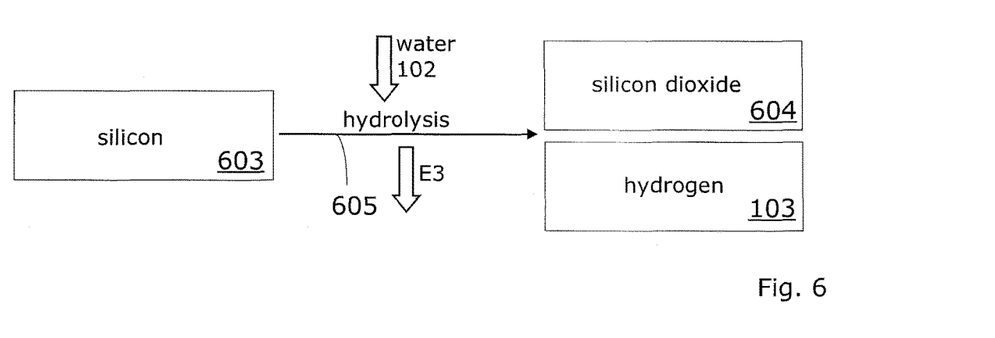
FIG. 6: shows a scheme illustrating the steps of a further partial method according to the invention.

In relation with FIG. 6, it is described how silicon 603 can be utilized as an energy carrier. The reduced silicon 603 is an energy-rich compound. This silicon has the tendency to oxidize with water in fluid or vapor form back again to silicon dioxide 604 (reverse reaction), as indicated schematically in FIG. 6. In the so-called hydrolysis 605 of the silicon 603, energy E3 (e.g., heat energy) is liberated because this concerns an exothermal reaction. In addition to the silicon dioxide 604, hydrogen 103 is formed, which can be utilized, for example, as an energy carrier for the generation of methanol 108. Preferably, the hydrolysis 605 takes place at elevated temperatures. Temperatures are preferred which are clearly above 100° C. In the temperature range between 100° C. and 300° C., a conversion in usable quantities is achieved in cases when the silicon 603 is brought in contact and mixed in a very finely grained or powdery consistency with water vapor 102. Since otherwise the silicon 603 has only a very low tendency to react with water up to approximately 300° C., the hydrolysis 605 is preferably performed in the temperature range between 300° C. and 600° C.

The hydrolysis can also be performed with aqueous hydroxide and alkali carbonate-solutions, for which preferably temperatures between 60° C. and 160° C. are used.

According to the invention, in a method according to FIG. 6, the silicon 603 is introduced into a reaction area and mixed with water 102 in liquid or vapor form. In addition, according to the invention, care is taken that the silicon 603 has a minimum (threshold) temperature. Either the silicon 603 is heated for this purpose (e.g., using heating means or by heat-generating or heat-releasing additives) or the silicon 603 is already at a corresponding temperature level when it is introduced.

Under these framework conditions, hydrogen 103 is then liberated in the reaction area as a gas. The hydrogen 103 is extracted from the reaction area.

In the following, a quantitative example for a method according to FIG. 6 or according to FIG. 5 in combination with FIG. 6 is presented:

1 mol (=60.1 g) $SiO_2$ forms 1 mol (=28 g) Si.
1 mol (=28 g) Si in turn forms 1 mol (=451 g) $H_2$. This means that 2.15 kg $SiO_2$ form 1 kg Si and froms this 1 kg Si in turn, 1.6 $m^3$ H2 are formed.

The generation of methanol can be carried out according to one of the methods known and used at large-scale. A method is preferred in which a catalyst (e.g., a CuO—ZnO—$Cr_2O_3$ or a Cu—Zn—$Al_2O_3$ catalyst) is used.

The invention has the advantage that in the reduction of the silicon dioxide and in the reduction of the water 102, no $CO_2$ is liberated as long as only energy E1 which originates from a plant 300 and/or 400 is utilized in these reactions. The required energy is therefore provided at least in part from renewable energy resources, preferably from the plants 300 and/or 400.

In the hydrolysis 605, the elementary silicon 603 is utilized preferably in a powder form or in a granular or grainy form.

According to the invention, $CO_2$ 101 serves as a starting material and as a carbon supplier for the synthesis of methanol in the reactor 106. Preferably, the following serve as a $CO_2$ source: steam reforming facilities, natural gas-$CO_2$-separation facilities, cement plants, bio-ethanol plants, seawater desalination facilities, power plants and other facilities or combustion processors which emit large quantities of $CO_2$.

The invention avoids the considerable economical disadvantages of known approaches, when—as in the case of the Silicon-Fire plant 100—the electric solar and/or wind energy, which is produced unsteadily, is directly converted to chemical reactions and is stored in a chemically bound form, without the additional capacities for reserve power and/or frequency regulation in the mixed network.

In the case that photovoltaic current is generated by means of a photovoltaic plant 400, there is a further advantage in that the DC current E1, which is primarily produced from the solar cells of the photovoltaic plant 400, can be utilized directly in the chemical process (electrolysis 105), without having to be converted using converters to an alternating (AC) current for the voltage transformation.

LIST OF REFERENCE NUMERALS

| | |
|---|---|
| car Industry/automotive Engineering | 1 |
| operator of Power Plant | 2 |
| wind farm | 3 |
| Silicon-Fire plant | 100 |
| carbon dioxide | 101 |
| water | 102 |
| hydrogen | 103 |
| providing carbon dioxide | 104 |
| carrying out an electrolysis | 105 |
| bringing together the hydrogen ($H_2$) and the carbon dioxide/synthesis reactor | 106 |
| delivering/providing methanol | 107 |
| transportable energy carrier | 108 |
| (facility) control device | 110 |
| parameter storage | 111 |
| control or signal lines | 112, 113, 114 |
| Silicon-Fire partial facility | 200 |
| combustion process | 201 |
| flue gas comprising $CO_2$ | 202 |
| Silicon-Fire flue gas cleaning facility | 203 |
| clean gas | 204 |
| flue free of $CO_2$ | 205 |
| extraction of $CO_2$ | 206 |
| solar thermal energy facility | 300 |
| conversion of heat to direct current | 301 |
| solar plant (photovoltaic plant) | 400 |
| mixed network | 500 |
| conversion of alternating voltage to direct current (energy supply facility) | 501 |
| silicon-dioxide-containing starting material | 601 |
| silicon | 603 |
| reduction process | 602 |
| silicon dioxide as a reverse reaction product | 604 |
| hydrolysis | 605 |
| direct current (DC) energy | E1 |
| additional electric power | E2 |
| energy | E3 |
| input parameters | I1, I2, etc. |
| primary energy | P1, P2 |
| reaction (product) heat from the synthesis of methanol | W1 |

What is claimed is:

1. A method for providing storable and transportable energy carriers comprising the steps of:
    providing carbon dioxide ($CO_2$) as a carbon supplier,
    providing electric direct current energy which is generated using renewable energy technology,
    providing additional electric energy originating from a power plant operated by fossil fuel or from an electrical mixed network,
    performing an electrolysis by application of said electric direct current energy and said additional electric energy so as to produce hydrogen ($H_2$) as an intermediate product, wherein the proportion of renewable electrical direct current energy and additional electric energy used for said electrolysis is regulated by a control device; and,
    bringing together said hydrogen ($H_2$) and said carbon dioxide ($CO_2$) to form methanol as a hydrocarbon-based energy carrier.

2. The method according to claim 1, wherein carbon dioxide ($CO_2$) is taken from a combustion process or an oxidation process by means of $CO_2$ precipitation.

3. The method according to claim 1, wherein said electrolysis is of silicon dioxide to reduce to silicon and said silicon is then reacted with water ($H_2O$) to produce hydrogen ($H_2$).

4. The method according to claim 1, wherein parameters entered into said control device to regulate the proportion of renewable electrical direct current energy and additional electric energy used for said electrolysis are determined by technical and/or economic factors.

5. The method according to claim 1, wherein the electrolysis is a water electrolysis in which hydrogen ($H_2$) is produced directly from water ($H_2O$).

6. The method according to claim 1, wherein direct current energy is supplied by sunlight using a solar heat plant and/or a photovoltaic plant.

7. The method according to claim 3, wherein the silicon is provided as a storable and transportable energy carrier and methanol is provided as a further storable and transportable energy carrier.

8. The method according to claim 3, wherein silicon is provided as a storable and transportable energy carrier, whereby in a further step, water or water vapor is brought in contract with the silicon so as to provide in a hydrolysis reaction, hydrogen, silicon dioxide and an amount of energy.

* * * * *